Feb. 16, 1971 W. D. BEAVER ET AL 3,564,463

MONOLITHIC PIEZOELECTRIC FILTER HAVING MASS LOADED ELECTRODES FOR RESONATION REGIONS ACOUSTICALLY COUPLED TOGETHER

Filed June 17, 1966 9 Sheets-Sheet 1

INVENTORS W. D. BEAVER
R. A. SYKES
BY Leo Stanger
ATTORNEY

LADDER MODEL

Feb. 16, 1971 W. D. BEAVER ET AL 3,564,463

MONOLITHIC PIEZOELECTRIC FILTER HAVING MASS LOADED ELECTRODES FOR RESONATION REGIONS ACOUSTICALLY COUPLED TOGETHER

Filed June 17, 1966 9 Sheets-Sheet 7

United States Patent Office 3,564,463

Patented Feb. 16, 1971

3,564,463

MONOLITHIC PIEZOELECTRIC FILTER HAVING MASS LOADED ELECTRODES FOR RESONATION REGIONS ACOUSTICALLY COUPLED TOGETHER

William D. Beaver, Center Valley, and Roger A. Sykes, Bethlehem, Pa., assignors to Bell Telephone Laboratories, Incorporated, Murray Hill, N.J., a corporation of New York Continuation-in-part of application Ser. No. 541,549, Apr. 11, 1966. This application June 17, 1966, Ser. No. 558,338

Int. Cl. H03h 9/00

U.S. Cl. 333—72 11 Claims

ABSTRACT OF THE DISCLOSURE

Energy is transmitted over a desired band by applying it to a pair of electrodes mounted on a crystal body and removing it from another pair of electrodes mounted on the crystal body. The electrodes have sufficient masses to concentrate thickness shear vibrations in the areas between the electrodes. The electrodes are spaced sufficiently far from the edges of the body so as to substantially eliminate the effects of the edges. The pairs of electrodes are spaced so as to couple the resonators formed by the electrodes and the body, but to limit the coupling below a given value.

This is a continuation-in part of the copending application of W. D. Beaver and R. A. Sykes, Ser. No. 541,549, filed Apr. 11, 1966, now abandoned.

This invention relates to energy translating means and particularly to devices that furnish low-loss selective energy transmission between respective energy paths by employing acoustically resonant crystal structures.

Hitherto such energy transmitting devices have employed several crystal structures, mainly as stable resonators, whose properties have been combined and modified by other components for establishing the overall energy translating characteristics. This combination and modification has been necessary because the geometry of the crystal bodies has so inelastically fixed the operating characteristics of each resonator that other control of the transmission characteristics becomes difficult. The resulting duplication of crystal structures and extra components has rendered such devices quite complex.

A common example of such a complex device is a so-called crystal filter. Here, electroded piezoelectric crystal bodies are used as high Q impedances and are electrically combined to form a passband network. Attempts have been made to combine the characteristics of two crystal resonators acoustically by mounting two sets of electrodes on a single body. However, here the geometry of the body has caused the resonators to interfere with one another and thereby distort the resulting bandpass. Only modifying components have furnished a means for controlling the filter passband.

In so-called dot-resonators many effects of body geometry have been eliminated so that several independently operating resonators can be mounted on one crystal structure. However, each resonator still has to be combined electrically with the others in the form of a lattice or ladder network for achieving selected passbands.

An object of this invention is to improve means for translating energy.

Another object is to transmit acoustically a selected energy spectrum between two selected energy paths with little or no loss.

Still another object of the invention is to control the acoustical performance of a crystal structure without altering the crystal body, particularly while utilizing the structure as a medium for transmitting a selected energy band.

Another object of the invention is to combine acoustically, crystal resonances on one crystal body in a controlled manner despite the geometry of the body.

Another object of the invention is to control the performance of a crystal structure without external components.

Yet another object of the invention is to control the characteristics of a crystal structure so that the structure alone, monolithically, is capable of performing many functions previously performed by whole networks incorporating such crystal structures.

A particular object of this invention is to control a monolithic crystal structure so as to render it capable of transmitting a predetermined energy band into a given termination, particularly in the manner of a filter operating with a given terminating impedance.

According to the invention these objects are achieved in a crystal structure between two energy paths, by loading the surface of a crystal body, cut for vibration in a shear mode, with two pairs of opposing plates whose masses are sufficiently great to concentrate the amplitude of the crystal body's shear vibrations in the vicinity of each pair and away from the boundaries of the body, while spacing the pairs within each other's regions of amplitude concentration and at a distance to furnish, in dependence on the loading and on the spacing, a given transmission characteristic for a given energy spectrum between the two selected energy paths. Preferably the plates are sufficiently massive so that shear vibration-amplitude in the body decreases exponentially with distance from the body portion between the masses of each pair.

Preferably the crystal body is a flat wafer which carries the masses of one pair on opposite faces.

According to a feature of the invention additional pairs of masses load the crystal body or wafer enough to concentrate energy amplitude in the vicinity of the body in each pair, but within the acoustical field of at least one other pair.

Still another feature of the invention involves making two mass-loading energy-concentrating pairs conductive and electrically exciting one pair from one energy path while removing energy from the other pair with the other energy path, thereby forming electrodes with each pair.

The invention is based in part on the recognition that the concentration of amplitude in the vicinity of mass-loaded pairs, and the spacing between the amplitude concentrating pairs, could be adjusted enough to control the coupling between the resonating pairs, over a wide enough range to conform the spectrum over which the energy is transmitted between the masses to a predetermined variable band. In effect then the mass-loading has been recognized as a means of binding the energy. The spacing has been recognized as a means of guiding the energy between the bound states. By virtue of the control achieved by binding and guiding considerable variation is possible in selecting the energy spectrum guided between two energy paths.

According to a more specific aspect of the invention a crystal body can be plated or electroded simply with sufficient masses to produce a particular passband for a particular load so as to form a filter. The behavior of the filter is easily controlled by variation of the mass-loading and distances between pairs.

These and other features of the invention are pointed out in the claims. Other objects and advantages of the invention will become evident from the following detailed description when read in light of the accompanying drawing wherein:

Figure 2:
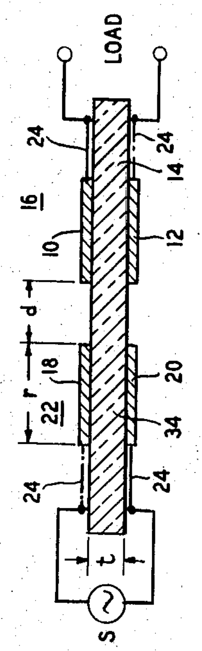
FIG. 2 is a schematic diagram showing the structure of FIG. 1 in use according to the features of the invention.
Figure 1:
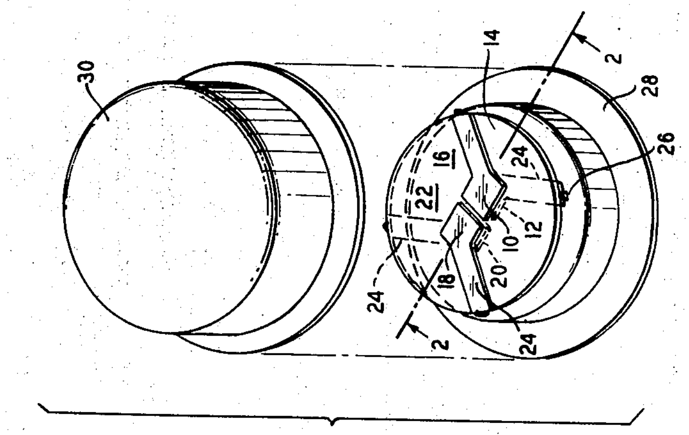
FIG. 1 is a perspective drawing of a structure embodying features of the invention.

In FIGS. 1 and 2 an example of the principles and advantages of the invention is shown by embodying the invention in a piezoelectric crystal structure that serves between a source and a load as a monolithic filter, that is a filter without additional components. The example illustrates the simplicity with which the characteristics of the device can thus be controlled. It also illustrates the degree to which the invention simplifies filters.

In FIG. 1, two identical gold rectangular electrodes 10 and 12 are vapor-deposited onto opposite faces of an AT-cut quartz crystal body or wafer 14 to form a first electrode pair 16. Another rectangular vapor-deposited gold electrode 18 forms with an identical electrode 20 on opposite sides of the body 14, a second identical electrode pair 22. Suitable metallic leads 24 also vapor-deposited on the crystal body 14 lead to edges of the wafer where the ribbons 26 soldered to the leads join the leads to pins, not shown, projected outwardly to the base 28 of the crystal filter. A cap 30 fitting about the crystal body 14 has its rim hermetically sealed to the rim of the base 28 to provide the finished unit. The electrode pairs 16 and 22 are aligned relative to each other parallel to the Z′ crystallographic axis of the crystal body 14. The gap between them extends parallel to the X crystallographic axis of the body.

FIG. 2 is a section of FIG. 1. However, it illustrates the structure of FIG. 1 with connections to serve as a monolithic filter between a source S and a load L. For clarity, FIG. 2 exaggerates the thickness of the crystal body 14. The source S supplies energy to the electrodes 18 and 20 near or at the shear mode fundamental frequency of the crystal body 14. The energy across the electrodes 18 and 20 piezoelectrically vibrate the body in a shear mode. The vibrations are sensed by the electrodes 10 and 12 and applied across a termination T.

According to the invention the electrodes 10, 12, 18 and 20 are sufficiently massive to create significant energy binding or "energy trapping." This mass-loading of the electrodes concentrates the amplitude of vibrations, imposed by the source S, in the wafer 14 regions between the electrodes of each pair 16 and 22 and makes the amplitude of vibration in the body 14 drop off exponentially as the distance from each electrode pair increases. According to the invention the mass loading is sufficient to decrease the vibration amplitude so the edges have no significant effect on operation.

At the same time according to the invention the distance *d* between the electrode pairs 16 and 22 is such as to place the pairs in each other's effective acoustic regions, that is where they still affect one another significantly, so that energy is guided or effectively tunnels between them. The mass-loading and energy-trapping conditions differ from the lightly-loaded or unelectroded crystal body. In the latter case the vibration amplitude decreases sinusoidally from a maximum at the point of energy application and is significant over the entire crystal body including the edges.

The changeover between the unelectroded condition and the energy-binding condition is quite noticeable as the mass of the plates increases. It occurs when the component wave vector in the region of the plate exceeds the magnitude of the wave number exclusive of the electroded region. A discourse concerning this subject appears in the Proceedings of the Seventeenth Annual Symposium on Frequency Control, held May 27 to 29, 1963, page 88 et seq.

The mass applied to the electrodes is not easily measured. However, a useful measure corresponding to the mass of the electrodes is available. It comes from the degree which the mass of one electrode pair lowers the resonant frequency of the body and from the resonant frequency of the unelectroded body, namely, from the fundamental shear mode of the body. The fractional shift of resonant frequency of the crystal body from the fundamental thickness shear frequency of the unelectroded plate as a result of electroding the crystal body with one pair of electrodes is called the plateback. This shift or plateback is a function of the electrode mass upon the crystal. Where several electrodes are loaded on the body the plateback tends to shift the individual and composite resonant effects along the frequency axis. Platebacks of .3 percent to 3 percent are useful in the environment of FIGS. 1 and 2.

Figure 3:
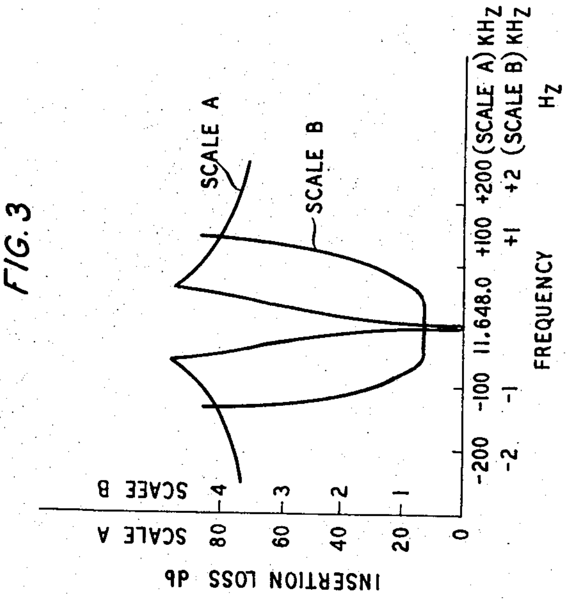
FIG. 3 illustrates the frequency response of the device in FIGS. 1 and 2.
Figure 4:
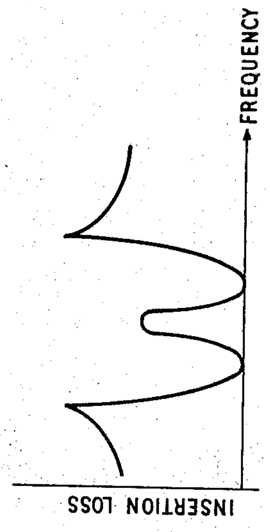
FIG. 4 is a response diagram of the device in FIGS. 1 and 2 when used according to the prior art.

The response of the crystal structure in FIGS. 1 and 2 with a plateback of 1.5 percent and suitable spacing *d* appears in FIG. 3 when terminated with a termination T matching the impedance at the midband frequency *fm* such as 5 to 15 mHz. As a result the structure constitutes an excellent monolithic filter. On the other hand, the same structure having substantially no mass loading exhibits the insertion loss illustrated in FIG. 4. Such a response renders the structure useless for most filter purposes unless electrical circuitry eliminates the center rejection band. However, the entire resulting passband is then usually too wide and too uneven for most high frequency filter purposes. In the past, structures of this type have found use in high frequency environments where one of the two adjacent passbands could be used and the other ignored. This resulted in transmission of considerable noise through the unused band.

Figure 5:
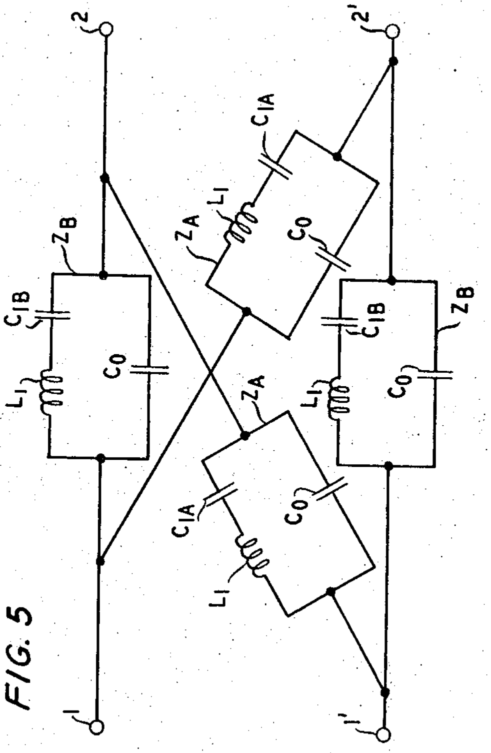
FIGS. 5 and 6 are schematic diagrams of equivalent electrical circuits for the device in FIGS. 1 and 2.
Figure 6:
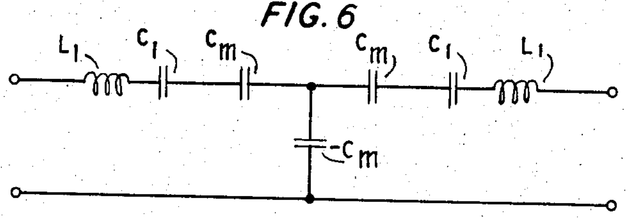

In the mass-loaded device of FIGS. 1 and 2 the bandpass of FIG. 3 is easily widened and narrowed by respectively reducing and increasing the distance *d*, or by reducing or increasing the mass-loading. This phenomenon can be explained by considering the equivalent electrical networks of FIGS. 5 and 6 for the device of FIGS. 1 and 2. FIG. 5 is the lattice equivalent network. The ladder equivalent network is in FIG. 6. In the ladder equivalent circuit of FIG. 6, the three capacitors $C_m$ represent the electrical equivalent of the acoustical coupling between the electrode regions of FIGS. 1 and 2. The two circuits are related to each other by the following equations:

$$C_{1B}=\frac{C_1}{1+\frac{C_1}{C_m}}$$

$$C_{1A}=\frac{C_1}{1-\frac{C_1}{C_m}}$$

The values $C_1$ and $L_1$ are such that the shear mode fundamental frequency equals $\frac{1}{2}\pi\sqrt{L_1C_1}$. The value of $L_1$ itself is a function of the crystal body thickness and the geometry of the electrodes 10, 12 and 18, 20. $C_{12}$ is the interelectrode capacitance between plate pairs 16 and 22. $C_0$ is the capacitance of one pair.

The lattice equivalent circuit is the easier one to analyze. Here, in FIG. 5 when the source S supplies energy to the electrodes 18 and 20, near or at the shear mode fundamental frequency, the circuit behaves as if composed of two pairs of resonant impedances $Z_A$ and $Z_B$. These impedances are useful for determining the value of the image impedance $Z_i$, which for the lattice structure of FIG. 5 is equal to the square root of $Z_AZ_B$. Since the crystal body 14 has a large Q, the values of the impedances $Z_A$ and $Z_B$ are almost exclusively comprised of their reactances $X_A$ and $X_B$. Thus, the image impedance $Z_i$ is equal to the square root of $X_AX_B$.

Figure 7:
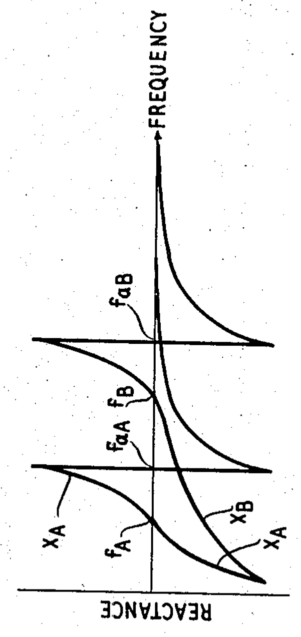
FIG. 7 is a diagram illustrating the reactance variation with frequency of the impedances in FIG. 5 when the device of FIGS. 1 and 2 is constructed according to the prior art.

In crystal structures which are not mass-loaded and the source S excites the entire crystal body, the reactances $X_A$ and $X_B$ of impedances $Z_A$ and $Z_B$ vary with the frequency as shown in FIG. 7. The reactance $X_A$ varies from a low negative value due to the capacitances in $Z_A$ through zero at a lower resonant frequency $f_A$ when the capacitance $C_1$ resonates with the inductor $L_1$. The reactance $X_A$ continues to a high positive value when the inductor $L_1$ resonates with its shunt capacitor $C_0$. At the frequency $f_{aA}$ the reactance changes from a high positive inductive value to a high negative capacitive value. This is called the antiresonant frequency $f_{aA}$. As the frequency increases, the prevailing capacitive reactance diminishes to zero. The reactance $X_B$ follows a similar curve with a resonant frequency $f_B$ and an antiresonant frequency $f_{aB}$.

Since $X_A$ and $X_B$ are imaginary numbers, that is they are equal to $jX'_A$ and $jX'_B$, their product is negative if they carry a like sign; but positive if they bear opposite signs. The square root of a positive number is real. Thus, in the frequency regions in which $X_A$ and $X_B$ appear on opposite sides of the abscissa, the filter exhibits real positive impedances $R_i$.

Figure 8:
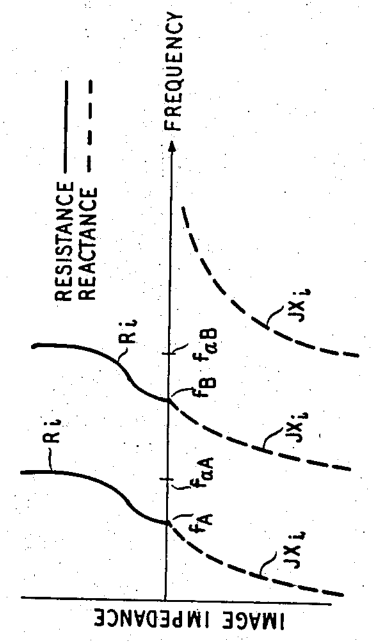
FIG. 8 is a diagram illustrating the image impedance variation with frequency of the device in FIGS. 1 and 2 when constructed according to the prior art.

A shown for the curves of FIG. 8, two real positive image impedances $R_i$ exist. They extend respectively across the lower resonant-to-antiresonant range $f_A$ to $f_{aA}$ and the upper resonant-to-antiresonant range $f_B$ to $f_{aB}$. Since insertion loss is minimum when the terminating impedance matches the image impedance, the insertion loss for such a device is very high in the reactive impedance region $f_{aA}$ to $f_B$. It is low only at two frequencies. For low load resistances the curves of FIG. 5 produce the insertion loss shown in FIG. 4.

The resulting response exhibits substantially two passbands. These render the structure alone unsuitable for high frequency filter use. The unsuitability is due largely to the capacitance $C_0$ of the electrodes themselves. This capacitance however is inevitable if the body is to vibrate piezoelectrically. Changing the total bandpass requires additional impedance components. These components can accomplish a number of results but generally complicate the filter to a great extent. The extra components can also attempt to control the ranges in which the passbands operate and possibly to eliminate the rejection band in the middle. The edges of the body 14 limit the degree to which the one single band can be made smaller than $f_{aA}$-$f_A$ or $f_{aB}$-$f_B$, nor the total band smaller than $f_{aB}$-$f_A$.

According to the invention giving the electrodes of the plates 10, 12, 18 and 20 sufficient mass concentrates the shear energy in the wafer 14 between the electrodes of the respective pairs 12 and 16 so that the crystal body 14 vibrates with greatly diminishing amplitude outside the area between the electrodes. No significant energy is permitted to reach the boundaries of the body 14. Such mass-loading of the plates produces two resonators. When these two resonators are placed in each other's effective field, they operate similar to a tuned transformer. Controlling the dimension *d*, *r* and the mass of the electrode pairs regulates the band or spectrum through which the energy of the system of the pair 22 passes to the system of the pair 16. This is the equivalent of controlling the coupling represented by capacitors $C_m$.

Figure 9:
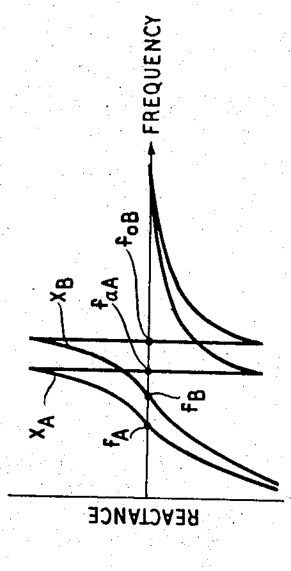
FIG. 9 is a diagram illustrating the reactance variation with frequency of the impedances in FIG. 5 when the device of FIGS. 1 and 2 is constructed according to the invention.
Figure 10:
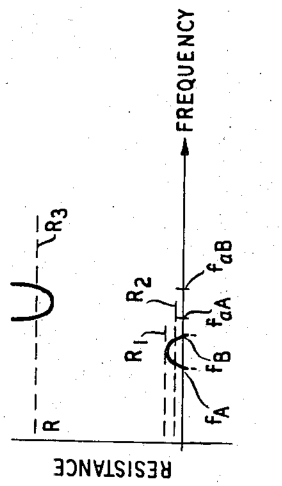
FIGS. 10 and 11 are diagrams illustrating the real and imaginary image impedances of the devices in FIGS. 1 and 2 when constructed according to the invention.
Figure 11:
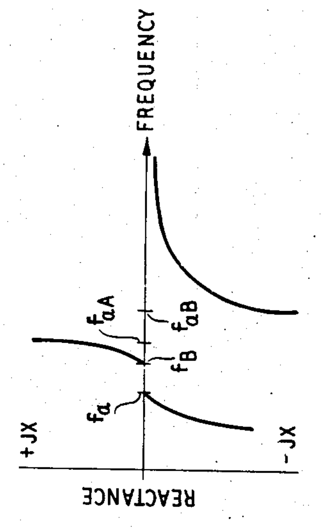

As is seen from FIG. 5, reducing the coupling between the electroded regions increases the value of $C_m$. As a result the ratio $C_1/C_m$ decreases in the equations for the values $C_{1B}$ and $C_{1A}$. This increases the denominator for $C_{1A}$ and decreases the denominator for $C_{1B}$. As a result the value of $C_{1A}$ decreases and the value of $C_{1B}$ increases. Thus, the resonant frequencies $f_A$ and $f_B$ approach each other. In one embodiment of the invention, they are made close enough to appear as shown in FIG. 9. Here, the two separate reactances $X_A$ and $X_B$ of impedances $Z_A$ and $Z_B$ follow paths similar to that in FIG. 7. However, the mass-loading and separation make the resonant-to-antiresonant ranges overlap. Now, the resonant frequency $f_B$ in the curve $X_B$ falls between the resonant frequency $f_A$ and the antiresonant frequency $f_B$. The resulting real and reactive image impedances $Z_i$, that is $R_i$ and $X_i$ appear in the real plane of FIG. 10 and the complex plane of FIG. 11. As shown in FIG. 10, the impedance $Z_i$ possesses two positive real ranges. One range extends between $f_A$ and $f_B$. $R_i$ starts at a value of zero, rises, and falls back to zero as the frequency increases. A second range lies between $f_{aA}$ and $f_{aB}$. There $R_i$ starts at infinity, drops and returns to infinity as the frequency rises. Separating the electrode pairs 16 and 22 thus moves the curves $X_A$ and $X_B$ closer together thus reducing each real impedance range.

One of the two frequency ranges can be rejected either by selecting a terminating impedance T within the resistance range of one resistance $R_i$ but out of the other, or by selecting the value of resistance $R_i$ to conform to the value of a desired load resistance. The mass-loaded structure of FIG. 1 distinguishes the impedance characteristics of each band from the other.

Stated otherwise, in this embodiment of the invention, electrode pairs are sufficiently loaded and separated to establish between the frequencies $f_A$ and $f_B$ a continuous real positive impedance whose value reaches a peak at substantially the mean frequency between the two. This in effect makes an efficient filter out of the structure in FIGS. 1 and 2. In this filter the bandwidths are variable according to the invention. Increasing the mass-loading or the distance *d* decreases the bandwith and vice versa.

Figure 12:
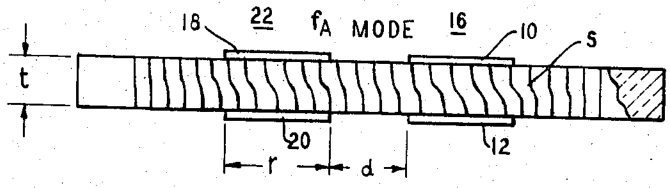
FIGS. 12 and 13 are functional sections of the device in FIG. 1 illustrating the shear motion in the crystal body in FIG. 1.
Figure 13:
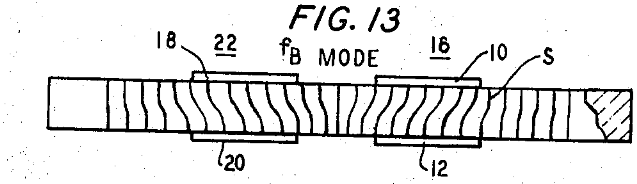

In the structure of FIG. 1, the frequencies $f_A$ and $f_B$ can be found physically by testing. At the frequency $f_A$ the shear oscillations between each electrode pair are in phase. At the frequency $f_B$ they are out of phase 180 degrees. These conditions appear in FIGS. 12 and 13. Here, the displacement in the lines S in the body 14 represent the shear vibrations in the body. The existence of these conditions have been ascertained by X-ray topographs. The concentration of the vibration amplitudes near the electrode pairs 16 and 22 due to mass-loading is depicted by changes in the amplitudes of the displacements within lines S.

Thus, according to this specific embodiment of the invention, in this environment the electrode pairs are sufficiently loaded and separated so that when operating in the shear mode there exists between the frequency at which the crystal body shear motions under the electrode pairs are in phase and the frequency under which they are out of phase, a continuous real impedance value which is a maximum at a frequency substantially midway between these two in-phase and opposite-phase frequencies.

Figure 14:
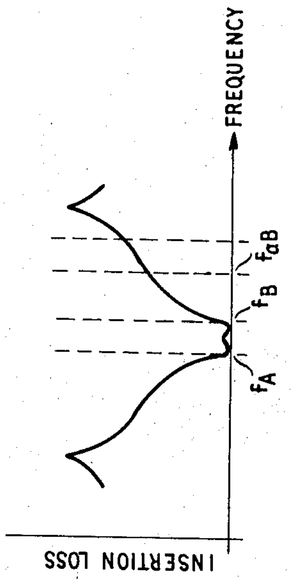
FIGS. 14 and 15 are diagrams illustrating the insertion losses for the device in FIGS. 1 and 2 when terminated in specific impedances to accentuate one of the two bands.
Figure 15:
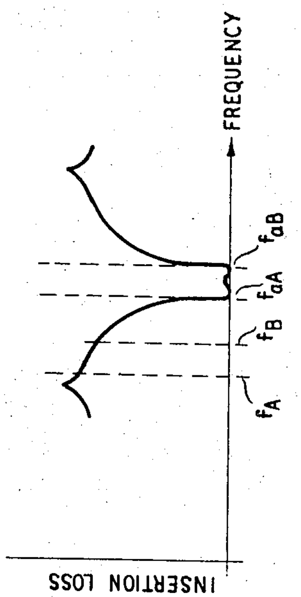

For example, the insertion loss of a device according to the invention with the termination impedance T matched to the maximum impedance $R_1$ in the lower range is shown in FIG. 3. The insertion losses for a filter terminated by a partly unmatched termination T equal to $R_2$ and $R_3$ are shown in FIGS. 14 and 15. According to a more specific embodiment of the invention the resonant-to-antiresonant ranges overlap to the point where the peak of the lower impedance range is less than .1 of the nadir on the higher impedance range in FIG. 10.

The principles of the invention may be applied for manufacturing a filter to a given bandwidth B$w$ about a chosen midband frequency $f_m$ at a predetermined impedance $Z_0$. This is done by first selecting an index frequency $f$ corresponding to a desired fundamental shear mode frequency. This frequency $f$ is such as to correspond to a suitable plateback $P_B$. These vary in practice from .3 percent to 3 percent.

$$P_B=\frac{f-f_m}{f}$$

$$fP_B=f-f_m$$

$$f(1-P_B)=f_m$$

$$f=\frac{f_m}{1-P_B}$$

The manufacture starts by first cutting a wafer 14 from a quartz crystal having the desired crystallographic orientation such as AT-cut. The wafer is then lapped and etched to a thickness $t$ corresponding to the desired fundamental shear mode index frequency $f$ in the usual manner. Generally, the thickness is inversely proportional to the desired frequency. A mask is placed over the crystal with cutouts for depositing electrodes. The size of the electrodes is determined by considering the desired bandwidth and the desired impedance. These establish the length of the individual electrodes from the formula $$Z_0=2\pi\frac{Bw}{f_m}5\times 10^b\times\frac{t^2}{r^2}$$

$$r=t\sqrt{\frac{Bw\pi}{Z_0 f_m}}\times 10^4$$

hence,
where $t$ is the plate thickness. Typically $r/t=12$, although in practice any value between 6 and 20 is usable. The value for $r$ arises from the fact that the value $Z_0$ is proportional to the inductance $L_1$ of the plate times $2\pi$ times the absolute bandwidth. The inductance can also be expressed either as $$L_1=\frac{50\times 10_7}{f_m}\left(\frac{t}{r}\right)^2$$

or $$L=\frac{K_x}{f_m^3}\times A_e$$

where A is the area of the electrodes and the value $K_x$ varies between 1.7 for square electrodes and 2.1 for circular electrodes. Thus, the electrode area is $$A_e=\frac{50\times 10^6\times f_m^2 t^2}{K_x r^2}$$

Figure 16:
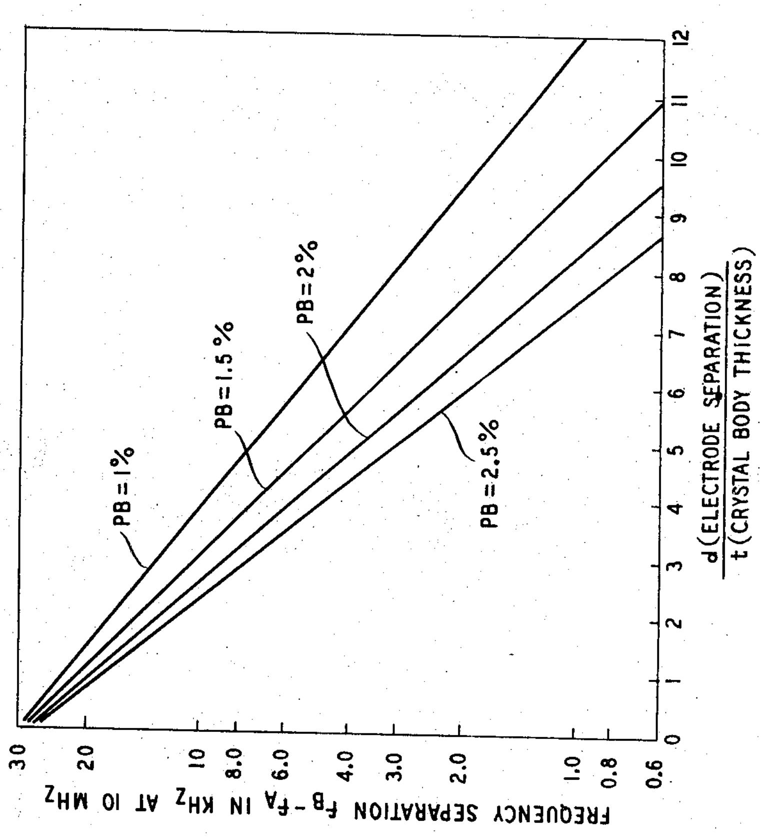
FIGS. 16, 17 and 18 are diagrams illustrating the relation of bandwidth to, the ratio of electrode separation to crystal body thickness, electrode size and the plateback of mass-loading.
Figure 17:
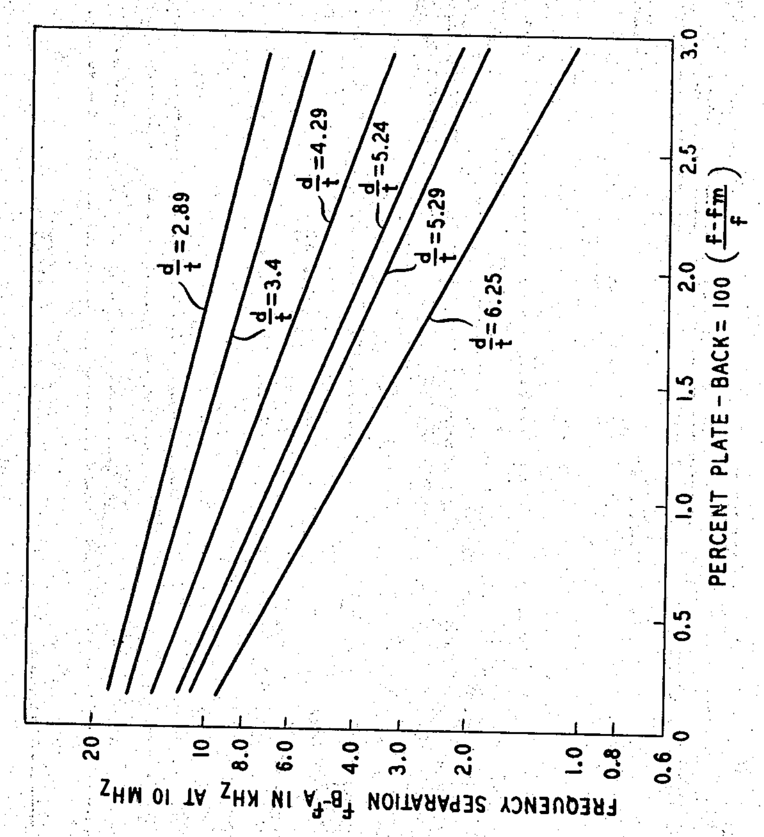
Figure 18:
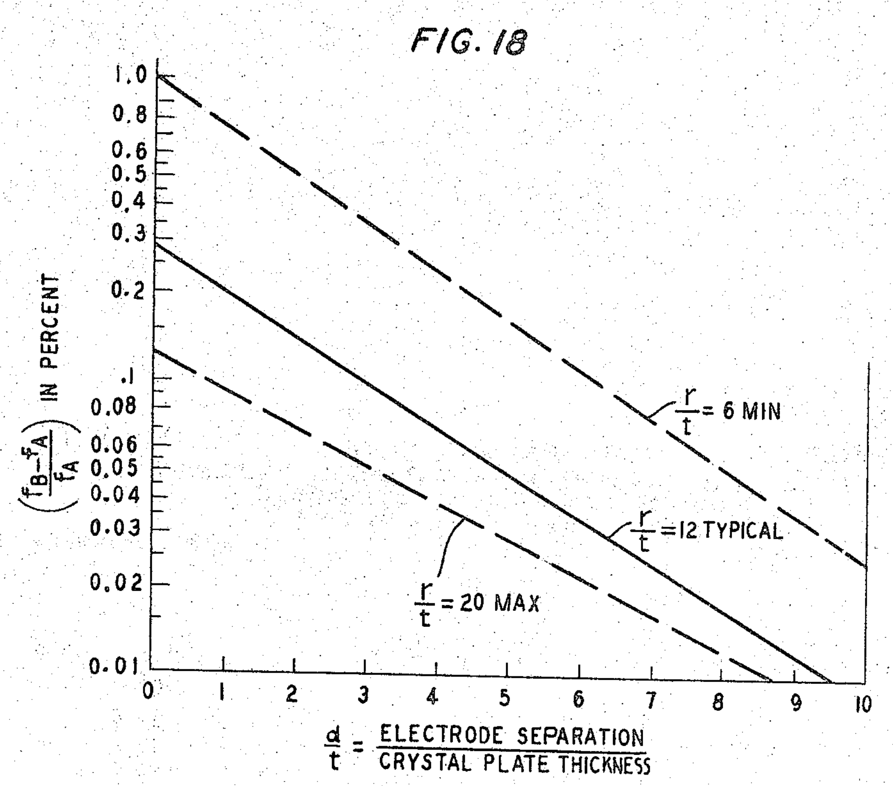

The proper separation $d$ between the electrodes may be determined from the graphs of FIGS. 16, 17 and 18 which show variations in percent bandwidth for various ratios of electrode separation to plate thickness and for various platebacks, as well as various values of $r/t$.

To obtain the chosen platebacks, gold is deposited through the mask in very light layers so as to make connections possible. Energy is applied to one pair of electrodes and mass added until a shift corresponding to the desired plateback occurs. This is done until the pair resonates at midband frequency $f_m$. The procedure is repeated for the other pair. During this procedure for the second pair, it may be necessary to obviate the effect of the first pair by terminating the pair inductively. The desired bandwidth should then prevail. In this environment the plateback is the percentage frequency decrease of the midband frequency $f_m$ between $f_A$ and $f_B$ from the fundamental thickness shear frequency of the unelectroded plate as a result of electroding.

The curves in FIGS. 16, 17 and 18 were developed from a sample crystal structure with divided electrodes and tuned to approximately 10 mHz. Using the platebacks of 1.0 percent to 2.5 percent the ratios of electrode separation to crystal plate thickness required for obtaining frequency separations about a 10-megacycle midband frequency of from 15 to 30 kilocycles are shown in FIG. 16. Here, the four curves each represent the relationship between $d/t$ to the frequency separation between $f_A$ and $f_B$ for four different platebacks. FIG. 16 shows that the greater the electrode separation and the greater the plateback, the lower is the frequency separation between $f_A$ and $f_B$. Thus, for narrowing bandwidth from any value the electrode separation and plateback are increased according to the invention. FIG 17. illustrates the conversion of this proposition for six electrode pair separations represented by six curves relating to percentage plateback to frequency separation. These results may be generalized for other midband frequencies if Bw is used as a percentage.

As shown from the beforementioned relations $$Z_0=2\pi BwL \text{ and } Z_0=2\pi\frac{Bw}{f_m}50\times 10^6\frac{t^2}{r^2}$$

the termination resistance for the lower transmission band is proportional to the inductance of the resonator for the desired bandwidth. If $r/t=12$, the bandwidth in cycles of the filter in FIG. 1 equals one-half the product of the matched termination impedance and the midfrequency in megacycles. For example, a 100 ohm filter at 10 megacycles can be matched to obtain the bandwidth of 500 cycles. If a bandwidth of 5,000 cycles is desired with a ratio $r/t=12$, the filter must be designed for a maximum low transmission band impedance of 1000 ohms. In general with $r/t=12$, 100-ohm filters at any high frequency has a bandwidth of .005 percent.

Figure 19:
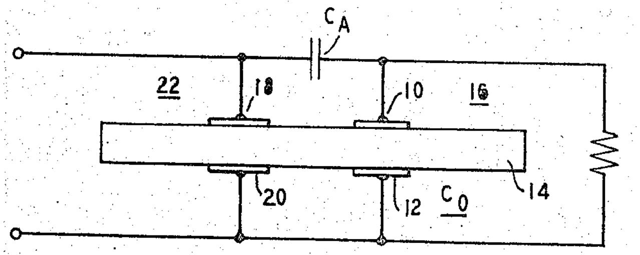
FIG. 19 is a circuit diagram of the device in FIG. 1 as otherwise embodied in a circuit according to the invention.
Figure 20:
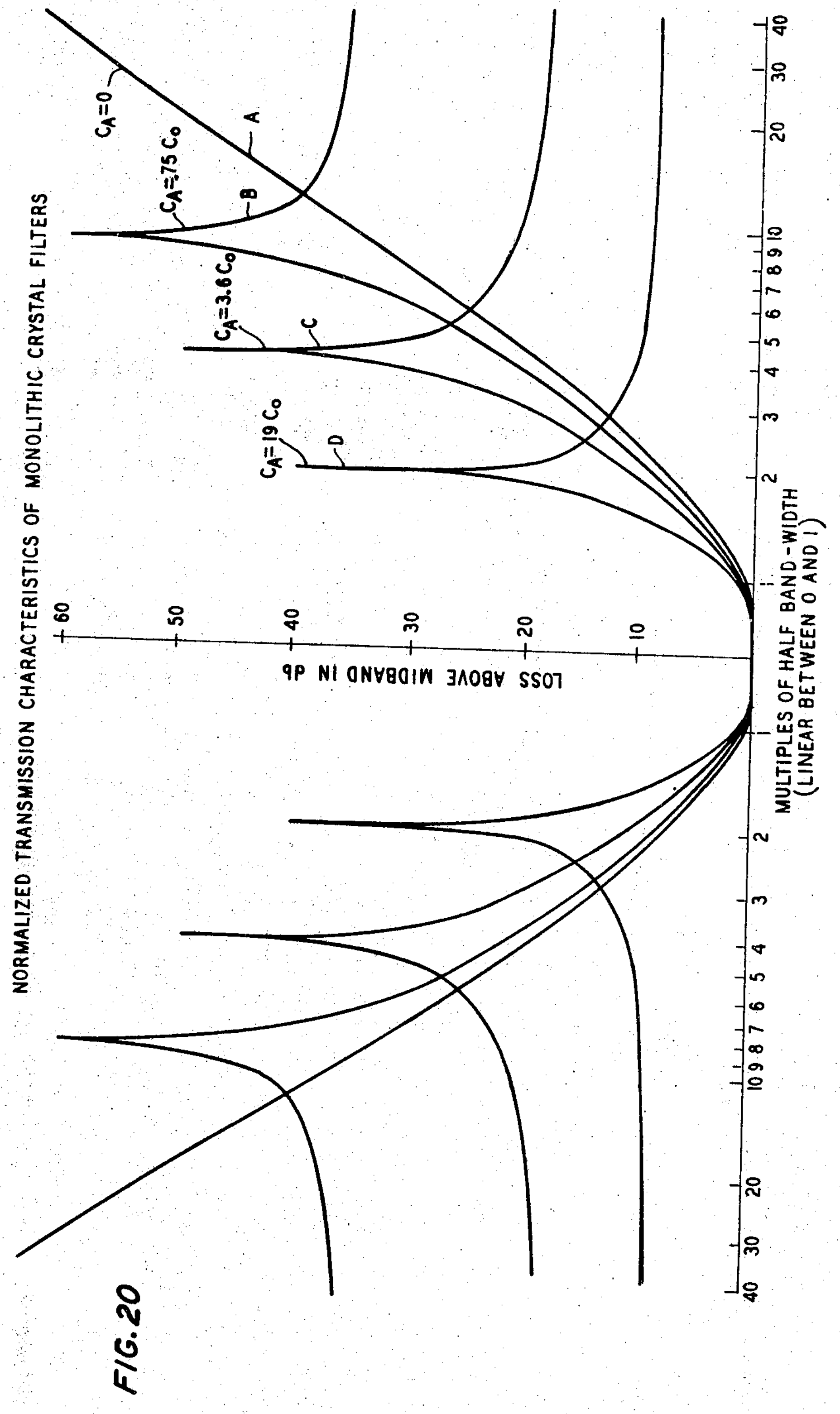
FIG. 20 is a graph illustrating the response of the circuit in FIG. 19.

By virtue of the invention, it is possible to utilize a single crystal structure as a complete filter. The invention permits easy control of the bandpasses. It also permits the structure to overcome the effects of electroding. Loading the structure according to the invention does not limit the filter to monolithic use as in FIG. 2. The filter may utilize additional bandshaping components in any combination between any of the electrodes 10, 12, 18 and 20. By adding a capacitor, for example, capacitor $C_A$, as shown in FIG. 19, the bandpass or insertion loss illustrated in FIG. 20 by the curve A when $C_A=0$, can be changed to the curves designated B, C and D. The frequency of these curves is shown in multiples of half bandwidths. However, for clarity the frequencies between 0 and 1 are linear. The curve B illustrates the insertion loss when $C_A$ is equal to .75 $C_0$, the capacitance across each electrode pair. Curves C and D illustrate the insertion loss response for values of $C_A$ equal to 3.6 $C_0$ and 19 $C_0$, respectively.

In the example of how the invention may be used to make a filter such as that of FIGS. 1 and 2, the quartz crystal body has a diameter of .590 inch and an approximate thickness of 0.0103 inch. The dimensions of the electrodes 10, 13, 18 and 20 are .2110 inch by .10555 inch and the electrode separation *d* is between the edges having the long dimension and is .124 inch. The electrode pairs 16 and 22 are aligned relative to each other along the Z' crystallographic axis of the crystal body 14. The mass of the electrodes are such as to achieve a plateback of 1.79 percent.

Such a structure exhibits a midband image impedance of 115 ohms for one passband and an image impedance for a second passband of several thousand ohms or more. The values $f_A$ and $f_B$ are 6.335868 and 6.336132 megacycles, respectively. The equivalent inductance L is 44 millihenries.

Experimentally in the range of resistances or real impedance between the resonances $f_A$ and $f_B$, wherein the resonant point $F_B$ of the higher reactance curve $X_B$ falls below the antiresonant frequency $f_{aA}$ of the lower reactance curve, the frequency separation between $f_A$ and $f_B$ has been found to be less than 1/500 of the center frequency, in the case of a quartz crystal vibrator employing the high frequency thickness shear mode of an AT-cut.

Figure 21:
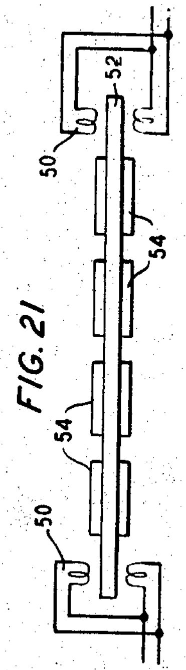
FIG. 21 is a partly schematic elevation of another device embodying features of the invention.

The above example of the invention's ability to exclude the geometry of the crystal wafer edges and to guide energy between two resonances shows how a filter of predetermined characteristics can be obtained from an otherwise inelastic device. There are other examples of the invention's effects. For example, the invention is not limited to crystal wafers carrying two pairs of metal electrodes. If a crystal is sufficiently mass-loaded with several pairs of nonmetallic plates, energy-binding prevails without the capacitive effect of electrodes. By varying the mass-loading and interplate spacing it is possible to obtain a multimode resonator device with coupled resonators. This corresponds to a multicoil tuned transformer. By applying energy nonelectrically such as magnetostrictively, the structure may be used as a controlled mechanical filter. This is shown in FIG. 21 where coils 50 impart shear vibrations and sense the energy from the body 52 carrying electrodes 54.

Figure 22:
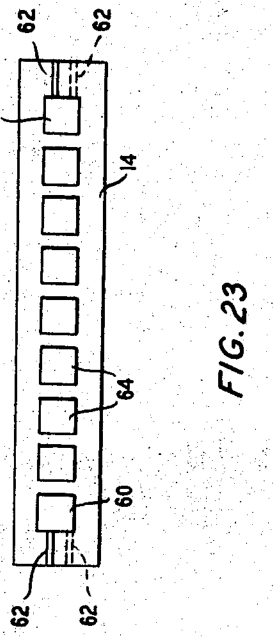
FIGS. 22 and 23 are plan views of two other devices embodying features of the invention.
Figure 23:
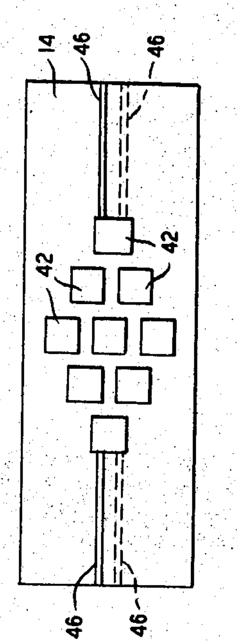

The invention may be embodied in a hybrid piezoelectric-mechanical structure. By mass-loading and spacing the plate pairs, many desired passbands may be achieved for filter use. Such a structure is illustrated in FIGS. 22 and 23. Here, vapor-deposited gold electrodes 60 in opposing pairs on opposite sides of the wafer 14 receive energy through leads 62. Intermediate non-metallic plates 64 appear on both faces of an AT cut crystal body 14 to form pairs. The plate pairs and electrode pairs are all sufficiently mass-loaded to produce enough energy-binding in the thickness shear mode to prevent significant effects from the plate edges, but are close enough to each other to guide significant energy from one to the other, i.e., be coupled. The degree of mass-loading and interpair spacing controls the coupling and hence the resulting passband.

Figure 24:
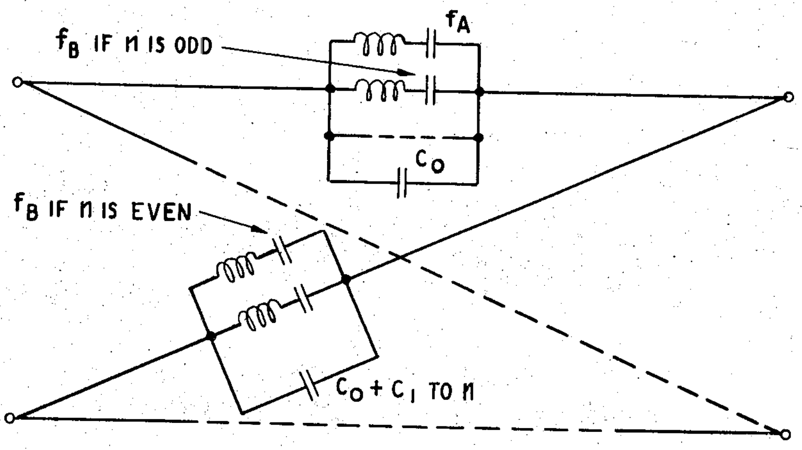
FIGS. 24 and 25 are circuit diagrams illustrating generalized equivalent circuits for the devices of FIGS. 21 and 22.
Figure 25:
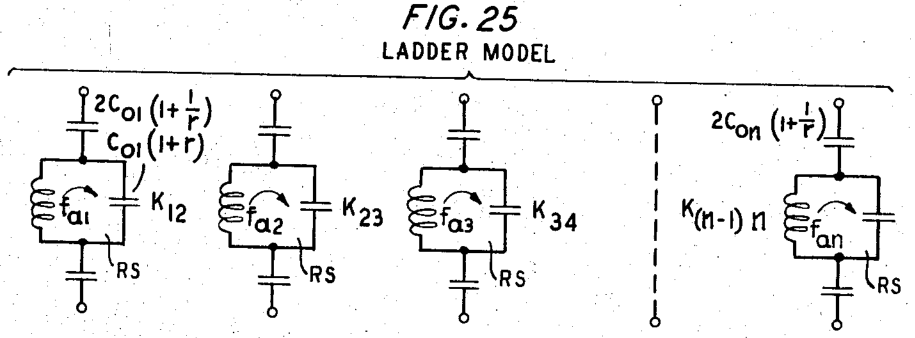

FIGS. 24 and 25 illustrate schematically two equivalent diagrams for the general case of the embodiments shown in FIG. 22. FIG. 24 is the lattice equivalent circuit. FIG. 25 is a ladder equivalent circuit. The ladder equivalent circuit is composed of a number of resonant circuits RS equal to the number *n* of pairs coupled to each other by values of $k_{12}, k_{23} \ldots k_{(n-1)n}$. The lattice equivalent circuit includes impedances $Z_A$ and $Z_B$ each having a plurality of series resonant circuits.

In the embodiment of FIG. 22 the body portions carrying the respective electrode pairs oscillate in phase at the lowest resonant frequency $f_A$, i.e., at the low end of the band. At the highest resonant frequency $f_B$, i.e., at the high end of the band, the respective body portions oscillate alternately in and out of phase with adjacent body portions.

These relations in oscillations can be observed in X-ray topographs. Here the section between the plate pairs are substantially opaque when the respective plate pairs oscillate in phase, and comparatively translucent when out of phase on the X-ray negative.

According to the invention the electrode pairs are loaded sufficiently relative to the spacing to reduce the interpair coupling enough so there exists a continuous real impedance between the low and high resonance.

The effect of the extra electrode pairs is to make the sidebands steeper. The sidebands may be made even more steep by permitting slight ripples in the passband.

Figure 26:
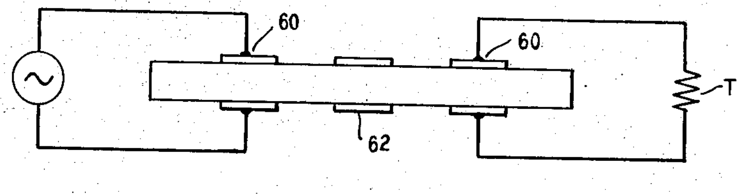
FIGS. 26 and 27 are schematic diagrams of other devices in their circuit environment embodying features of the invention.
Figure 27:
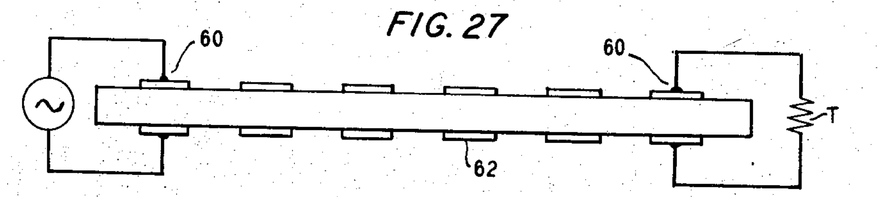
Figure 28:
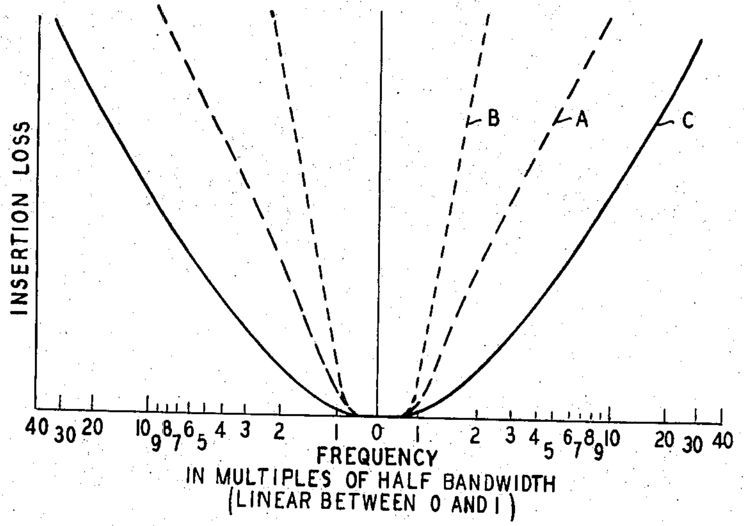
FIG. 28 is a diagram illustrating the insertion loss variation with frequency of the devices in FIGS. 19, 26 and 27.

Sample passbands for two mass-loaded crystal structures with coupled multimode resonators of FIGS. 26 and 27 appear in FIG. 28 as curves A and B. Curve C is the passband for a smiliar dual mode resonator. Reference numerals correspond to those of FIGS. 22 and 24.

The plates 64 may be metallic. In any case, the multimode resonators can be considered as extensions of the dual mode structure in FIG. 1. The plates 64 shape the band.

Figure 29:
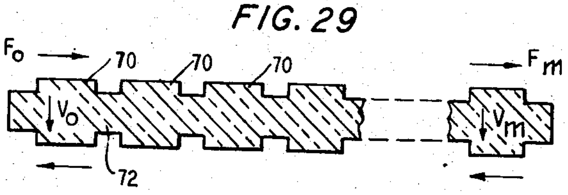
FIG. 29 is a diagram showing a generalized form of a multimode resonator according to the invention.
Figure 30:
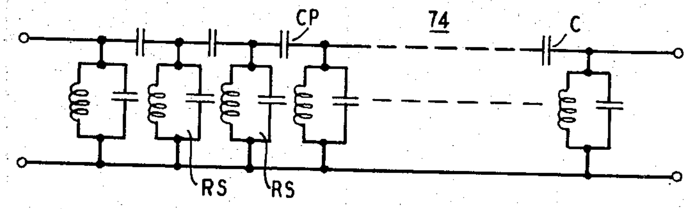
FIG. 30 is a diagram of the equivalent electric circuit of the device in FIG. 29.

The invention in its most generalized form appears in FIG. 29. This shows a mechanical filter composed of a series of individual shear type resonators 70 coupled by the elastic constants of the material 72. The impedance and resonant frequency of each resonator may be varied. The inter-resonator coupling may also be varied. The structure may be driven by a piezoelectric or mechanical transducer having a bandwidth greater or equal to the mechanical filter shown. $F_0$ and $V_0$ are the input force and velocity. $F_m$ and $V_m$ are the output force and velocity respectively.

While embodiments of the invention have been described in detail it will be obvious to those skilled in the art that the invention may be embodied otherwise within its spirit and scope.

What is claimed is:

1. A monolithic filter comprising, in combination, a mechanically resonant piezoelectric body having opposite faces, a first pair of opposing plate means on opposite faces of said body, a second pair of opposing plate means on opposite faces of said body, said pairs of plate means forming with said body a structure which when energized, has an equivalent lattice network with line and diagonal impedances whose respective reactance-frequency characteristics define respective resonant to antiresonant frequency ranges, said pairs of plate means having masses sufficient to confine a major portion of mechanical resonant energy applied thereto near said plate means and away from the borders of said body, said pairs of plate means having a distance between them such as to limit the interaction between said pairs and overlap the resonant to antiresonant frequency ranges, the portions of said body between said plate means being coupled acoustically as a result of the combined effect of said masses and said distance whereby energy transfer between said pairs of plate means is limited substantially to acoustic energy.

2. A filter as in claim 1 wherein the body is a piezoelectric crystal and wherein the filter exhibts a low-impedance passband having a bandwidth less than 1/500 of its center frequency.

3. A filter as in claim 1 further comprising additional pairs of plate means on said body, said additional plate means being located between said first and second plate means.

4. Apparatus for translating input oscillatory electrical energy having first characteristics to output oscillatory electrical energy having second characteristics, comprising, in combination, an acoustically resonant piezolectric body excitable in a thickness mode and having defined boundaries, a first region in said body composed at least partially from the material of said body and having a characteristic resonant frequency $f_1$, a second region in said body composed at least partially from the material of said body and entirely surrounded by said first region, said second region having a resonant frequency $f_2$ differing from said resonant frequency $f_1$, a third region in said body composed at least partially from the material of said body and entirely surrounded by said first region, said third region having a resonant frequency $f_3$ differing from said resonant frequency $f_1$, electrical energy transmitting means for transmitting energy to said body and exciting said body in a thickness mode, second electrical energy transmitting means for transmitting energy from said body to a load, the resonant frequencies $f_2$ and $f_3$ being sufficiently different from said resonant frequency $f_1$, as the result of mass loading said second and third regions, that upon the excitation of said body the acoustic energy associated with said second and third regions is confined substantially to the vicinity of said second and third regions, said first region being characterized by an exponential decrease in the magnitude of said energy as the distance from said second and third regions increases, said second and third regions being at a sufficiently close preselected distance so as to place each of said second and third regions within the acoustic field of the other, said second and third regions being coupled acoustically as the result of the combined effect of said mass loading and of said preselected distance whereby energy transfer between said second and third regions is limited substantially to acoustic energy, said energy transmitting means forming with said body a circuit having an input and an output, said circuit exhibiting an image resistance that varies with frequency, said frequencies $f_2$ and $f_3$ being sufficiently different from said frequency $f_1$ and said second and third regions being spaced sufficiently far apart from each other that said image impedance is characterized by a real positive continuous portion that starts at substantially zero, increasing to a finite maximum value and decreasing to substantially zero as frequency increases, said image impedance being characterized further by a second portion that starts at a substantally infinite value, decreasing to a nonzero minimum value greater than said maximum value and increasing to a substantially infinite value as frequency increases, said second portion being higher in frequency than said first portion.

5. Apparatus for translating input oscillatory electrical energy having first characteristics to output oscillatory electrical energy having second characteristics, comprising, in combination, an acoustically resonant piezoelectric body excitable in a thickness mode and having defined boundaries, a first region in said body composed at least partially from the material of said body and having a characteristic resonant frequency $f_1$, a second region in said body composed at least partially from the material of said body and entirely surrounded by said first region, said second region having a resonant frequency $f_2$ different from the characteristic frequency $f_1$ of said first region, a third region in said body composed at least partially from the material of said body and entirely surrounded by said first region, said third region having a resonant high frequency $f_3$ different from said resonant frequency $f_1$ of said first region, the electrical energy transmitting means for transmitting energy to said body and exciting said body in a thickness shear mode, second electrical energy transmitting means for transmitting energy in said body to a load, said resonant frequencies $f_2$ and $f_3$ being sufficiently different from said resonant frequency $f_1$ as the result of mass loading said second and third regions, that upon the excitation of said body the acoustic energy associated with said second and third regions is confined substantially to the vicinity of said second and third regions, said first region being characterized by an exponential decrease in said acoustic energy as the distance from said second and third region increases, said second and third regions being spaced from the boundaries of said body, said second and third regions being at a sufficiently close preselected distance so as to place each of said second and third regions within the acoustic field of the other, said second and third regions being coupled acoustically as a result of the combined effect of said mass loading and said preselected distance whereby energy transfer between said second and third regions is limited substantially to acoustic energy, said electrical energy transmitting means forming with said body a circuit having an input and an output, said circuit having a lattice equivalent circuit with line and diagonal impedances, said line and diagonal impedances having resonant frequencies $f_A$ and $f_B$ and antiresonant frequencies $f_{aA}$ and $f_{aB}$, said second and third regions exhibiting resonant frequencies $f_2$ and $f_3$ sufficiently different from said resonant frequency $f_1$ of said first region and being spaced sufficiently from each other that both of said antiresonant frequencies $f_{aA}$ and $f_{aB}$ are higher than both of said resonant frequencies $f_A$ and $f_B$.

6. Apparatus as defined by claim 4 further comprising a fourth region in said body composed at least partially of said body material and having a resonant frequency $f_4$, said fourth region being surrounded by said first region and spaced from the edges of said body, said resonant frequency $f_4$ being sufficiently different from said resonant frequency $f_1$ of said first region and being spaced sufficiently close to said second and third regions so as to be coupled thereto through said first region, said coupling being mainly mechanical and being sufficient to pass acoustic energy to and from said fourth region.

7. Apparatus as defined in claim 4 wherein said frequencies $f_2$ and $f_3$ are substantially equal.

8. Apparatus as defined in claim 4 wherein said body includes a plurality of additional regions each having a resonant frequency sufficiently different from said resonant frequency $f_1$ to confine acoustic energy to each of said additional regions when said body is excited in the vicinity of said additional regions, said last named acoustic energy decreasing in magnitude exponentially in said first region as the distance from said additional regions increases, said additional regions being spaced from the borders of said body, said borders having substantially no effect on vibrations in said additional regions, said additional regions being spaced sufficiently close to each other and two of said additional regions being spaced sufficiently close to said second and third regions respectively, to permit the passage of acoustic energy from said second region to said third region by way of each of said additional regions and said first region.

9.An electrochemical filtermefizpi.&

9. An electromechanical filter comprising, in combination, a body of piezoelectric material, a pair of input electrode means sandwiching a first region of said body therebetween, a pair of output electrode means sandwiching a second region of said body therebetween, means for applying electrical energy to said input electrode means, means for extracting a preselected band of said electrical energy from said output electrode means, each of said pairs of electrode means having sufficient mass to decrease exponentially the amplitude of acoustic energy in said body other than in said first and second regions as the distance from said regions increases, thereby to confine said acoustical energy substantially to a limited acoustic field in said body about each of said regions and away from the edges of said body, said pairs being spaced sufficiently within each others acoustical field and spaced sufficiently far from the edges of said body, to permit the guidance of acoustical energy through said body over a preselected energy band from said first region to said second region, the characteristics of said band being determined primarily by the size and masses of said electrode means and by the distance between said regions and being substantially independent of the edges of said body, said first and second regions being coupled acoustically as a result of the combined effect of the magnitudes of said mass and the placing of said pairs within each others acoustical field whereby energy transfer between said pairs of plate means is limited substantialy to acoustic energy.

10. An electromechanical filter comprising, in combination filter comprising, in combination, a body of piezoelectric material, first means for applying an oscillatory electrical input signal to a first region of said body, spaced from the edges of said body, second means for extracting an oscillatory electrical output signal corresponding to a preselected energy band of said input signal from a second region of said body spaced from said first region and from the edges of said body, said first and second means being charatcerized by mass loading thereby enabling a substantial concentration and trapping of acoustic energy by said first and second means, each of said regions being within the acoustic energy field of the other, and third means restricting substantially all of the eenrgy transfer between said portions to acoustic energy, said third means being established by the combination of effects resulting from said mass loading and energy trapping and from the acoustic coupling effected by the location of each of said portions within the acoustic field of the other, said first and second means including input terminals and output terminals thereby to form a circuit, said circuit being characterized by an image impedance that varies with frequency and that has a real positive continuous portion starting at substantially zero, increasing to a finite maximum value and decreasing to substantially zero as frequency increases, said image impedance being further identifiable by a second real positive continuous portion that starts at a substantially infinite value, decreasing to a nonzero minimum value greater than said maximum value and increasing to a substantially infinite value as frequency increases, said second portion being higher in frequency than said first portion, the stated characteristics of said image impedance being determined primarily by said combination of effects of energy trapping and acoustic coupling.

11. An electromechanical filter comprising, in combination, a body of piezoelectric material, first means for applying an oscillatory electrical input signal to a first region of said body, spaced from the edges of said body, second means for extracting an oscillatory electrical output signal corresponding to a preselected energy band of said input signal from a second region of said body spaced from said first region and from the edges of said body, said first and second means being characterized by mass loading thereby enabling a substantial concentration and trapping of acoustic energy by said first and second means, each of said regions being within the acoustic energy field of the other, and third means restricting substantially all of the energy transfer between said portions to acoustic energy, said third means being established by the combination of effects resulting from said mass loading and energy trapping and from the acoustic coupling effected by the location of each of said portions within the acoustic field of the other, said first and second means including input terminals and output terminals thereby to form a circuit, said circuit having an equivalent circuit comprising a lattice with line and diagonal impedances, said impedances having resonant and antiresonant frequencies, two of said antiresonant frequencies being higher than the highest one of said resonant frequencies.

the defined relation of said resonant and antiresonant frequencies being determined substantially by said combination of effects of energy trapping and acoustic coupling.

References Cited

UNITED STATES PATENTS

| | | | |
|---|---|---|---|
| 3,074,034 | 1/1963 | Crownover | 333—72 |
| 3,222,062 | 12/1965 | Curran et al. | 333—72 |
| 3,396,327 | 8/1968 | Nakazawa | 333—72 |
| 3,384,768 | 5/1968 | Shockley | 310—9.5 |
| 3,401,276 | 10/1968 | Curran et al. | 310—9.5 |
| 3,363,119 | 1/1968 | Koneval et al. | 310—9.5 |

OTHER REFERENCES

Electronics and Comm. of Japan #9 September 1965 pp. 84–91 by M. Onoe "Piezo-Electric Resonators Vibrating in Trapped Modes."

HERMAN KARL SAALBACH, Primary Examiner

C. BARAFF, Assistant Examiner

U.S. Cl. X.R.

310—9, 9.4, 9.8; 333—74

Disclaimer 3,564,463.—*William D. Beaver*, Center Valley, and *Roger A. Sykes*, Bethlehem, Pa. MONOLITHIC PIEZOELECTRIC FILTER HAVING MASS LOADED ELECTRODES FOR RESONATION REGIONS ACOUSTICALLY COUPLED TOGETHER. Patent dated Feb. 16, 1971. Disclaimer filed Jan. 27, 1976, by the assignee, *Bell Telephone Laboratories, Incorporated.*

Hereby enters this disclaimer to claims 1, 2 and 9 of said patent.

[*Official Gazette March 23, 1976.*]

REEXAMINATION CERTIFICATE (467th)

United States Patent [19]

Beaver et al.

[11] B1 3,564,463

[45] Certificate Issued Feb. 18, 1986

[54] MONOLITHIC PIEZOELECTRIC FILTER HAVING MASS LOADED ELECTRODES FOR RESONATION REGIONS ACOUSTICALLY COUPLED TOGETHER

[75] Inventors: William D. Beaver, Center Valley; Roger A. Sykes, Bethlehem, both of Pa.

[73] Assignee: Bell Telephone Laboratories, Incorporated, Murray Hill, N.J.

Reexamination Reqs:st:

No. 90/000,624, Sep. 12, 1984

No. 90/000,720, Feb. 7, 1985

Reexamination Certificate for:

Patent No.: 3,564,463

Issued: Feb. 16, 1971

Appl. No.: 558,338

Filed: Jun. 17, 1966

Disclaimer of claim(s)

1, 2 and 9 filed: Jan. 27, 1976 (944 O.G. 1549)

Related U.S. Application Data

[63] Continuation-in-part of Ser. No. 541,549, Apr. 11, 1966, abandoned.

[51] Int. Cl.[4] .......... H03H 9/56

[52] U.S. Cl. .......... 333/191; 333/189

[58] Field of Search .......... 333/187-192, 333/186

[56] References Cited

U.S. PATENT DOCUMENTS

| | | | |
|---|---|---|---|
| 2,886,787 | 5/1959 | Broadhead et al. | 333/191 |
| 2,967,958 | 1/1961 | Kosowsky et al. | |
| 3,297,968 | 1/1967 | Fowler | 333/187 |
| 3,437,848 | 4/1969 | Börner et al. | 333/187 |

OTHER PUBLICATIONS

Herzog-"Siebschaltungen mit Schwingkristallen.", 2nd Ed., 1962, Friedr. Vieweg & Sohn, Braunschweig, 1962; pp. 92-93.

Brailsford-"Generalized Curves for the Design of the Two-Crystal Bandpass Filter", Marconi Review, vol. 9, Apr.-Jun. 1946; pp. 40-63.

Mingins et al., "An Investigation of the Characteristics of Electromechanical Filters", Final Report on DA 36-039-SC-5402, Dept. of Army, Tufts College (Feb. 10, 1954).

Curran et al.-"Research Into New Approaches For VHF Filter Crystals", First Quarterly Report, Contract DA 36-039 AMC-022245 (E), Fort Monmouth, New Jersey, dated Dec. 9, 1963.

Szentirmai-"On the Realization of Crystal Band-Pass Filters", IEEE Trans. Circuit Theory, vol. CT-11, No. 2 (Jun. 1964) pp. 299-301.

Nakazawa-"High Frequency Crystal Electromechanical Filters", Proc. of the 16th Annual Symposium on Frequency Control, 1962; pp. 373-390.

Shockley et al.-"Energy Trapping and Related Studies of Multiple Electrode Filter Crystals", Proc. 17th Frequency Control Symposium, (1963); pp. 88-126.

Nakazawa-"High Frequency Crystal Electromechanical Filters and Their Characteristics", Electronics (Ja pan) vol. 8, Dec. 1963; pp. 1407-1412.

Onoe et al.-"Analysis of an Energy-Retaining Piezoelectric Resonator", Ultrasonic Research Committee data, Industrial Technology Research Institute, Tokyo University (Kansai) Feb. 1, 1965 (translation), 22 pages.

Gerber et al.-Hybrid Piezoelectric Devices, 4th Quarterly Report, Feb. 16, 1965-May 15, 1965, Contract No. DA 28-043AMC-00079 (E), U.S. Army Electronics Laboratory, Clevite Corp., Sec. 1.4, Jun. 18, 1965; 13 pages.

Toyo Communication Equipment Co., Ltd. Advertisement, May 1965, Proc. IEEE, p. 14A.

Mason-"Electrical Wave Filters Employing Quartz Crystals As Elements", BSTJ, vol. 13, No. 3, Jul. 1934; pp. 405-452.

Chester-"Crystal Filter Design", Electronic Technology, Apr. 1962; pp. 126-131.

Dishall-"Reference Data For Radio Engineers", 4th Edition, ITT Corp. 1956; pp. 164-224.

Dishall-Modern Network Theory-Design of Crystal Filters for Communications and Navigation", Aeronautical Electronics Digest; pp. 381-382.

Wall-"Example Of Filter Synthesis Problems", IEE Electronics Division, Colloqium on Filter Design, Savoy Place, London, Apr. 29, 1964; 14 pages.

Gehrels-"Research and Development on Crystal Filters", Final Report E.R.D.C. Project C72, C.R. Snelgrove Co., Ltd., AD 475841, Aug. 1965; pp. 1-25.

Storch-"High Frequency Crystal Filters", First Quarterly Report, DA 36-039 SC-73070, Hughes Aircraft Co., AD 130244, Feb. 1, 1956; pp. 3-6.

Crawford-"High Frequency Quartz Crystal Bandpass Filters", Electrical Design News, Sep. 1962; pp. 80-87.

"Quartz Resonator Handbook", DA 36-039-SC-71061, The Dept. of the Army, Union Thermoelectric Div., Comptometer Corp., 1960; pp. 1-26, 35-37, 107-115.

Zverev-"Introduction To Filters", Electro-Technology, vol. 73, #6, Jun. 1964; pp. 61-90.

Dishall-"Single Sideband Crystal Filters", Proc. 13th Annual Symposium on Frequency Control, May 1959; p. 1959.

Kosowsky-"High Frequency Crystal Filter Design Techniques and Applications", Proc. IRE vol. 46, Feb. 1958; pp. 419-429.

Terman-"Radio Engineers Handbook", McGraw-Hill, 1943, pp. 64-65.

Mortley-"Frequency-Modulated Quartz Oscillators for Broadcasting Equipment", Proc. IEE Paper No. 2302R, Dec. 1956; pp. 239-253.

*Primary Examiner*—Marvin L. Nussbaum

[57] ABSTRACT

Energy is transmitted over a desired band by applying it to a pair of electrodes mounted on a crystal body and removing it from another pair of electrodes mounted on the crystal body. The electrodes have sufficient masses to concentrate thickness shear vibrations in the areas between the electrodes. The electrodes are spaced sufficiently far from the edges of the body so as to substantially eliminate the effects of the edges. The pairs of electrodes are spaced so as to couple the resonators formed by the electrodes and the body, but to limit the coupling below a given value.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4–8 and 10–11 is confirmed.

Claims 1, 2 and 9 were previously disclaimed.

Claim 3 is cancelled.

* * * * *